United States Patent
Martinus Lenkens

(10) Patent No.: US 6,296,302 B1
(45) Date of Patent: Oct. 2, 2001

(54) METHOD OF OPENING AND CLOSING AN OPEN ROOF CONSTRUCTION OF A VEHICLE HAVING AN OPENING IN THE FIXED ROOF; AS WELL AS SUCH OPEN ROOF CONSTRUCTION

(75) Inventor: Petrus Christiaan Martinus Lenkens, Beugen (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/485,056
(22) PCT Filed: Sep. 1, 1998
(86) PCT No.: PCT/NL98/00490
 § 371 Date: Feb. 2, 2000
 § 102(e) Date: Feb. 2, 2000
(87) PCT Pub. No.: WO99/11479
 PCT Pub. Date: Mar. 11, 1999

(30) Foreign Application Priority Data

Sep. 3, 1997 (NL) .................................................. 1006925

(51) Int. Cl.$^7$ ................................................ B60J 7/047
(52) U.S. Cl. ...................................... 296/220.01; 296/223
(58) Field of Search .............................. 296/220.01, 223

(56) References Cited

U.S. PATENT DOCUMENTS 5,484,185 * 1/1996 Salz et al. ........................ 296/220.01
5,658,042 * 8/1997 Ruhringer et al. .......... 296/220.01 X
5,836,642 * 11/1998 Salz .................................. 296/216.02
5,897,160 * 4/1999 Reihl et al. ....................... 296/220.01

FOREIGN PATENT DOCUMENTS 4329583  10/1994  (DE) .
3801881   4/1998  (DE) .

* cited by examiner

Primary Examiner—Dennis H. Pedder
(74) Attorney, Agent, or Firm—Westman, Champlin & Kelly, P.A.; S. Koehler

(57) ABSTRACT

With a method for opening and closing an open roof construction of a vehicle having a roof opening (2) in its fixed roof (1), which comprises at least three movably supported louvres (3, 3', 3") for selectively closing or at least partially opening said roof opening, said louvres are moved between their closed position, in which they abut in a substantially flat manner against each other, and their open position, in which they are positioned close together, one behind the other, in an obliquely upwardly pivoted position. In order to open the roof from the front side or the rear side, the louvre (3) present at the rear end, seen in the opening direction, pivots upwards and slides to the open position first, and the adjacent louvres (3', 3") are successively opened by being operated by the preceding louvre. The invention also comprises an open roof construction for use with such a method.

11 Claims, 7 Drawing Sheets

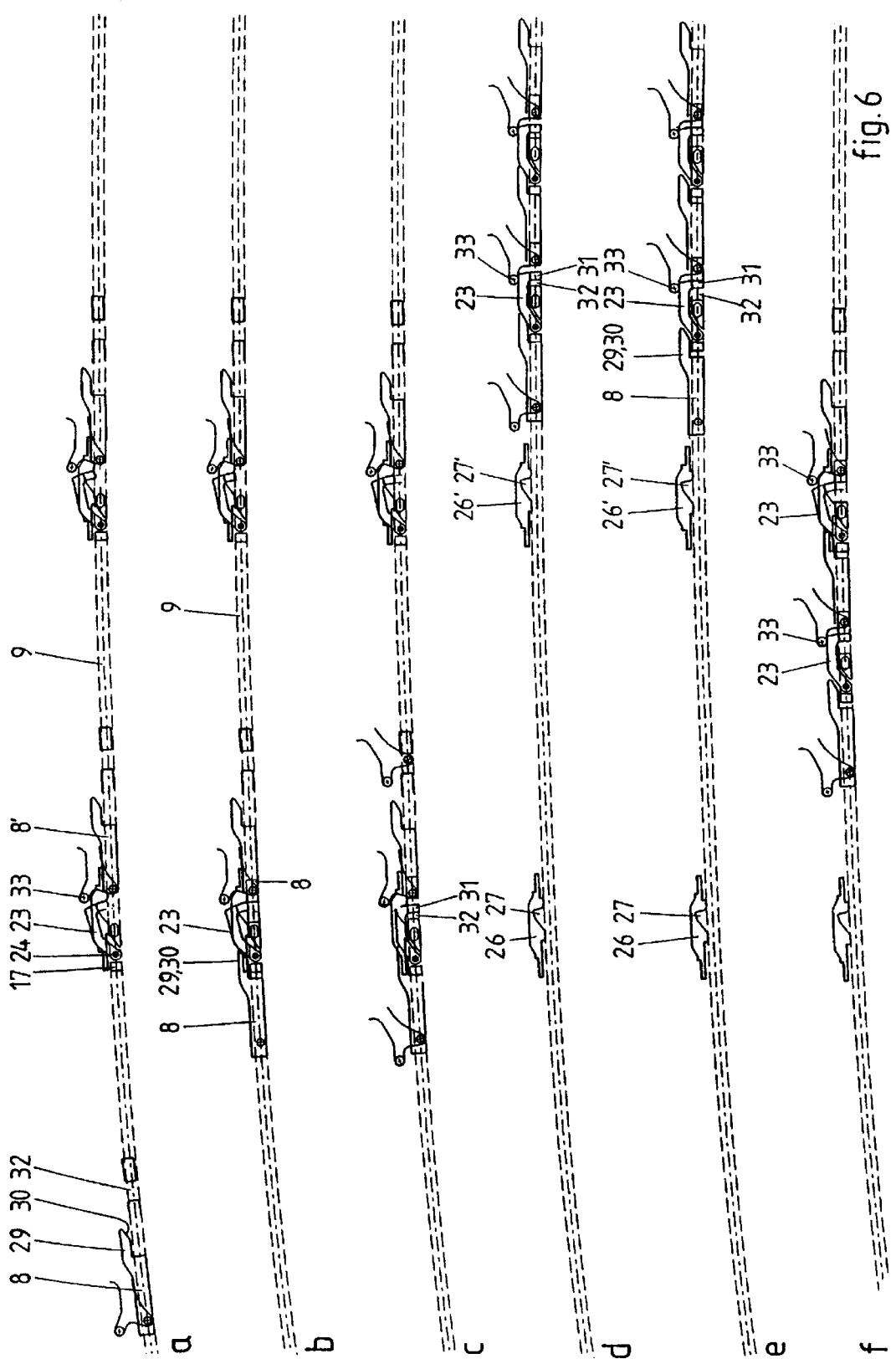

METHOD OF OPENING AND CLOSING AN OPEN ROOF CONSTRUCTION OF A VEHICLE HAVING AN OPENING IN THE FIXED ROOF; AS WELL AS SUCH OPEN ROOF CONSTRUCTION

CROSS-REFERENCE TO RELATED APPLICATION

This application claims priority of International application Ser. No. PCT/NL98/00490, filed Sep. 1, 1998 and published in English.

BACKGROUND OF THE INVENTION

The present invention relates to a method for opening and closing an open roof construction of a vehicle having a roof opening in its fixed roof; and also to such an open roof construction for use therewith.

Such a method and such an open roof construction are for example known from DE-C-19542884.

SUMMARY OF THE INVENTION

The object of the present invention is to provide a new way of opening and closing a roof. In particular, a multiple spoiler roof is provided, as it were, wherein a single panel is divided up into several louvres. The forces which are exerted on these smaller louvres when the vehicle is driving are considerably smaller than in the case of a large panel. This makes it possible to choose a larger roof opening. Due to the smaller forces, the louvres can furthermore be supported far to the front of each louvre, as a result of which the louvres can be moved close together. This in turn makes it possible to release a larger part of the roof opening in the entirely open position of the open roof construction, without this necessarily leading to instability in the support of the louvres.

BRIEF DESCRIPTION OF THE DRAWINGS

The invention will be explained in more detail hereafter with reference to the drawings, which show an embodiment of the invention by way of example.

FIGS. 6a–f are side views of driving slides for the louvres and the associated couplings in different positions thereof.

DETAILED DESCRIPTION OF THE ILLUSTRATIVE EMBODIMENTS

Figure 1:
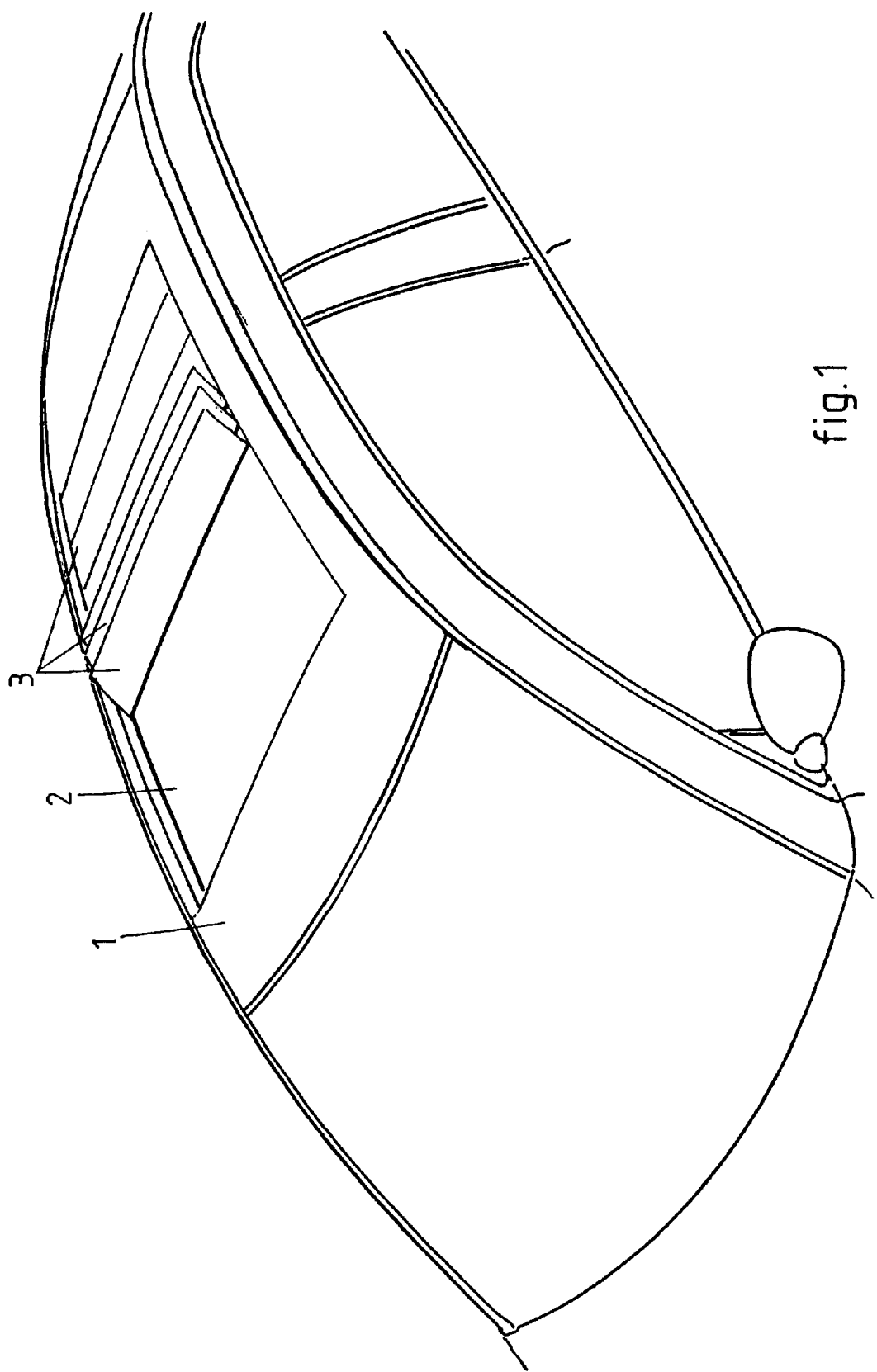
FIG. 1 is a general perspective schematic view of a roof of a vehicle, showing an embodiment of the open roof construction according to the invention present therein.

The drawings, and in first instance FIG. 1 thereof, show a part of a vehicle comprising a fixed roof 1 or a roof edge or a roof plate, in which a roof opening 2 is formed. The roof opening 2 can be selectively closed and at least partially opened by operating a closure mechanism of an open roof construction, which closure mechanism includes a number of louvres 3 in this embodiment. Said louvres may be made of a rigid, transparent plastic or of glass, but they may also be made of steel or other rigid or less rigid materials.

Figure 4A:
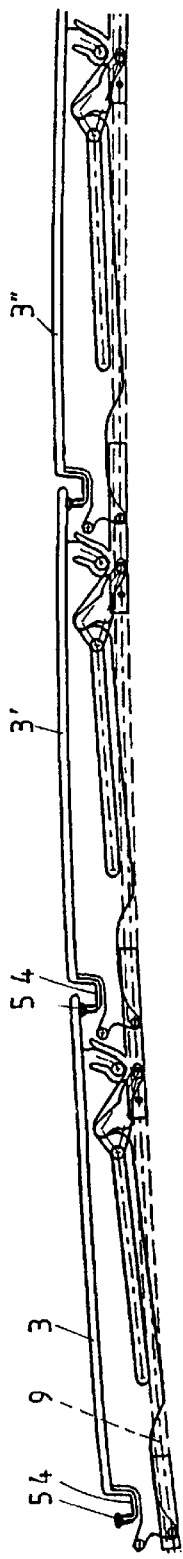
FIGS. 4a–e are side views of simplified mechanisms and the associated louvres in the same positions as in FIG. 3.

In particular FIGS. 4a–e show the way in which the louvres 3 are moved for opening the roof opening 2. In FIG. 4a, the louvres 3 occupy the closed position, in which they abut in a substantially flat manner, and in which they preferably lie substantially flush with the fixed roof 1. Downwardly recessed water channels 4 (FIG. 4a) are formed in the front edges of the louvres 3, the front edge of which is provided on the upper side with a seal 5, which abuts against the underside of the louvre 3 positioned in front thereof for the second and following lourvres 3' and 3" and against the front edge of fixed roof 1 for the first lourve 3. The ends of the water channels 4 open above a drain portion present in a stationary part of the vehicle, in the frame or in a stationary guide 9, so as to further discharge the water outside the vehicle. In the closed position of the open roof construction, sealing means (not shown) provide a seal between the louvres 3 and the edge of the roof opening 2 or parts positioned thereunder.

Figure 4B:
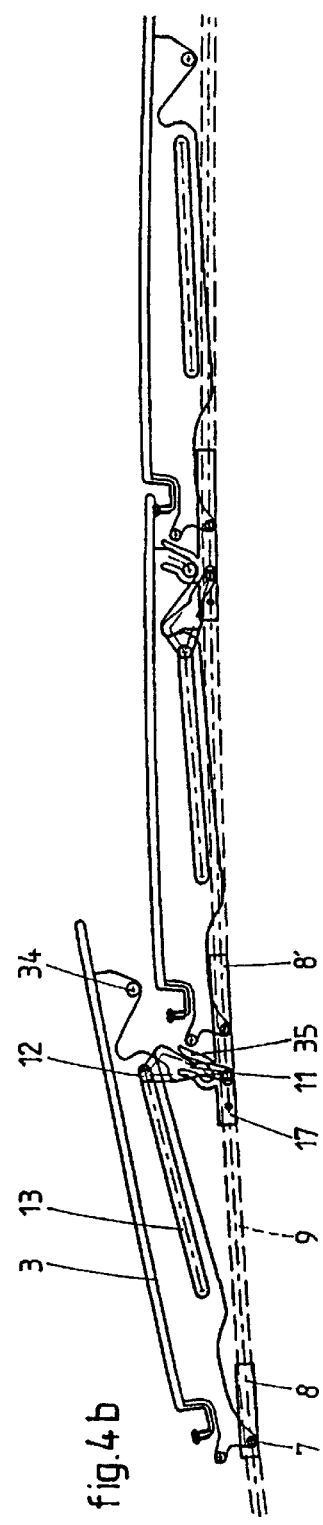

FIG. 4b shows that front louvre 3, which is disposed at the rear end of the louvre assembly, is the first to open from this closed position, in this case by moving rearwardly and pivoting simultaneously therewith, whereby the rear end of the louvre 3 is lifted. It would also be possible, of course, to pivot the louvre 3 completely upwardly first and only then move it rearwardly.

Figure 4C:
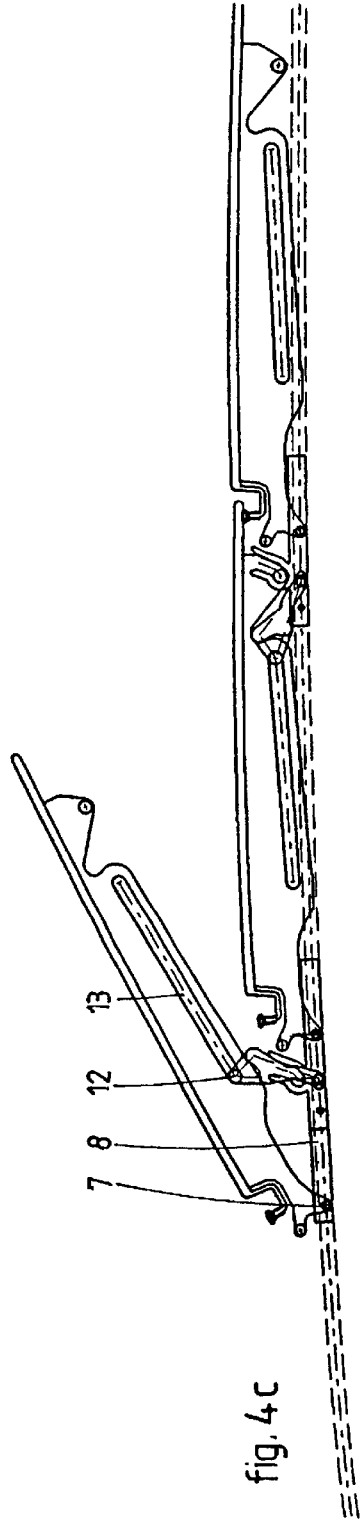

In FIG. 4c the front louvre 3 is shown to have been moved completely rearwardly with respect to the next louvre 3', and further movement in rearward direction cannot take place without moving the next louvre 3'.

Figure 4D:
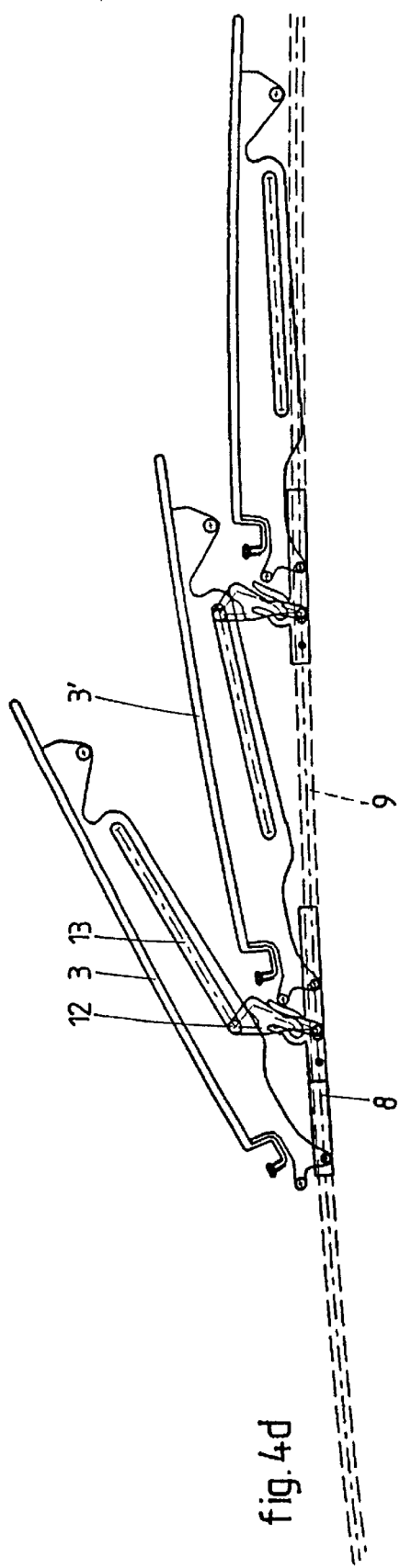

FIG. 4d shows how the second louvre 3' is driven by the first louvre 3, whereby it starts to make the same sliding and pivoting movement as the front louvre 3.

Figure 4E:
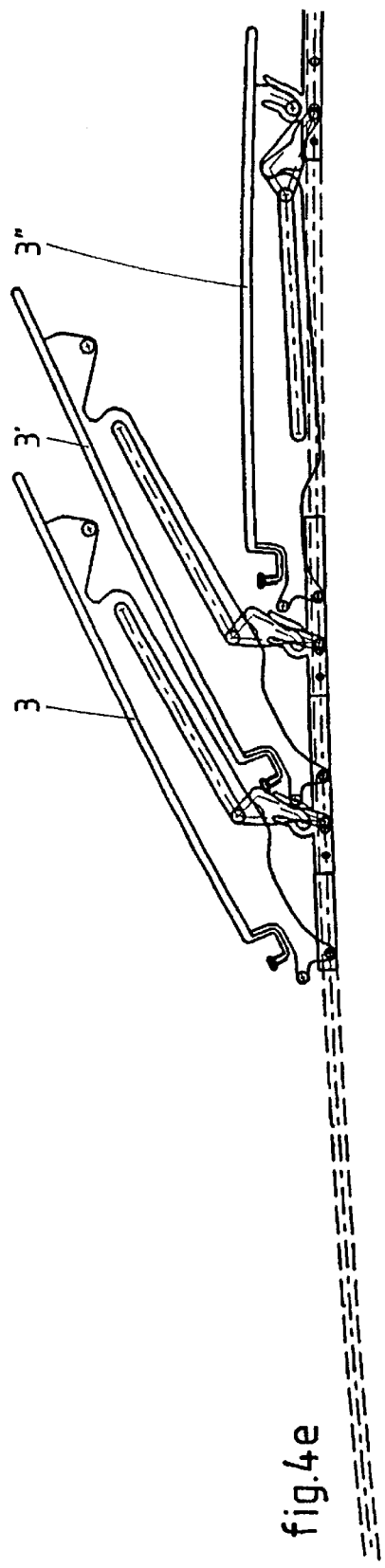

In FIG. 4e, the two louvres 3, 3' are completely nested, and a third louvre 3" will now be moved in the same manner. All louvres can be operated in this manner, so that all the louvres 3 are positioned close together, one behind the other, in an obliquely upwardly pivoted position near a rear edge of the roof opening 2 in the entirely open position of the roof opening 2.

Figure 3:
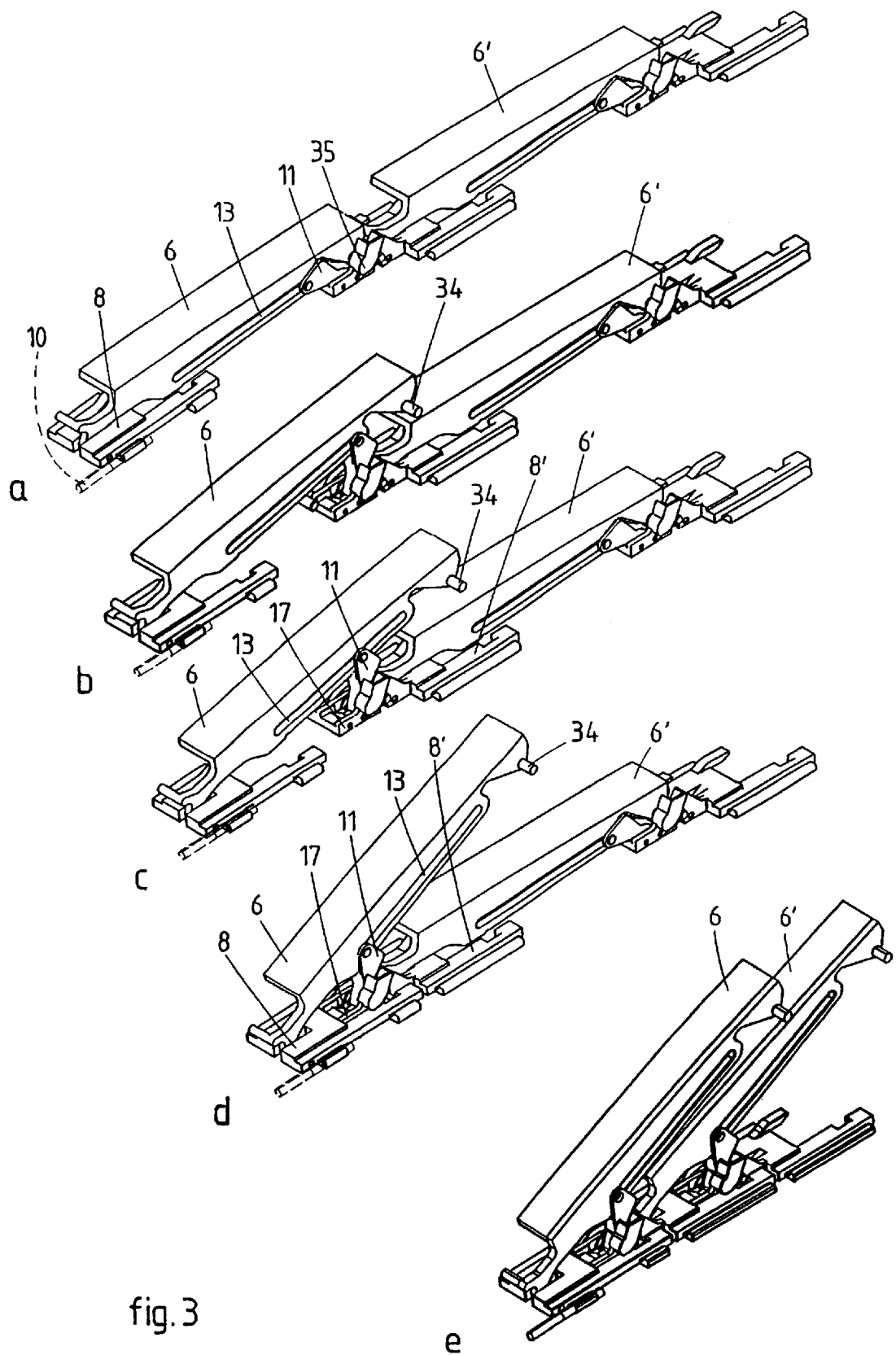
FIGS. 3a–e are larger-scale perspective views of the operating mechanism on one side of two louvres, showing said operating mechanisms in five different positions thereof.

The closing of the roof opening 2 takes place in the reverse order, so that first the rear louvre 3 moves to its flat position, which is repeated until all the louvres are in the closed position as shown in FIG. 3a again.

Now the mechanism by means of which the above movements can be carried out will be described. The description and the drawings show the parts present on one side of the roof, whereby it must be considered that corresponding parts are shown in mirror image in this embodiment on the other side. The operation of the mechanism and other mechanisms will be described later on.

Figure 2:
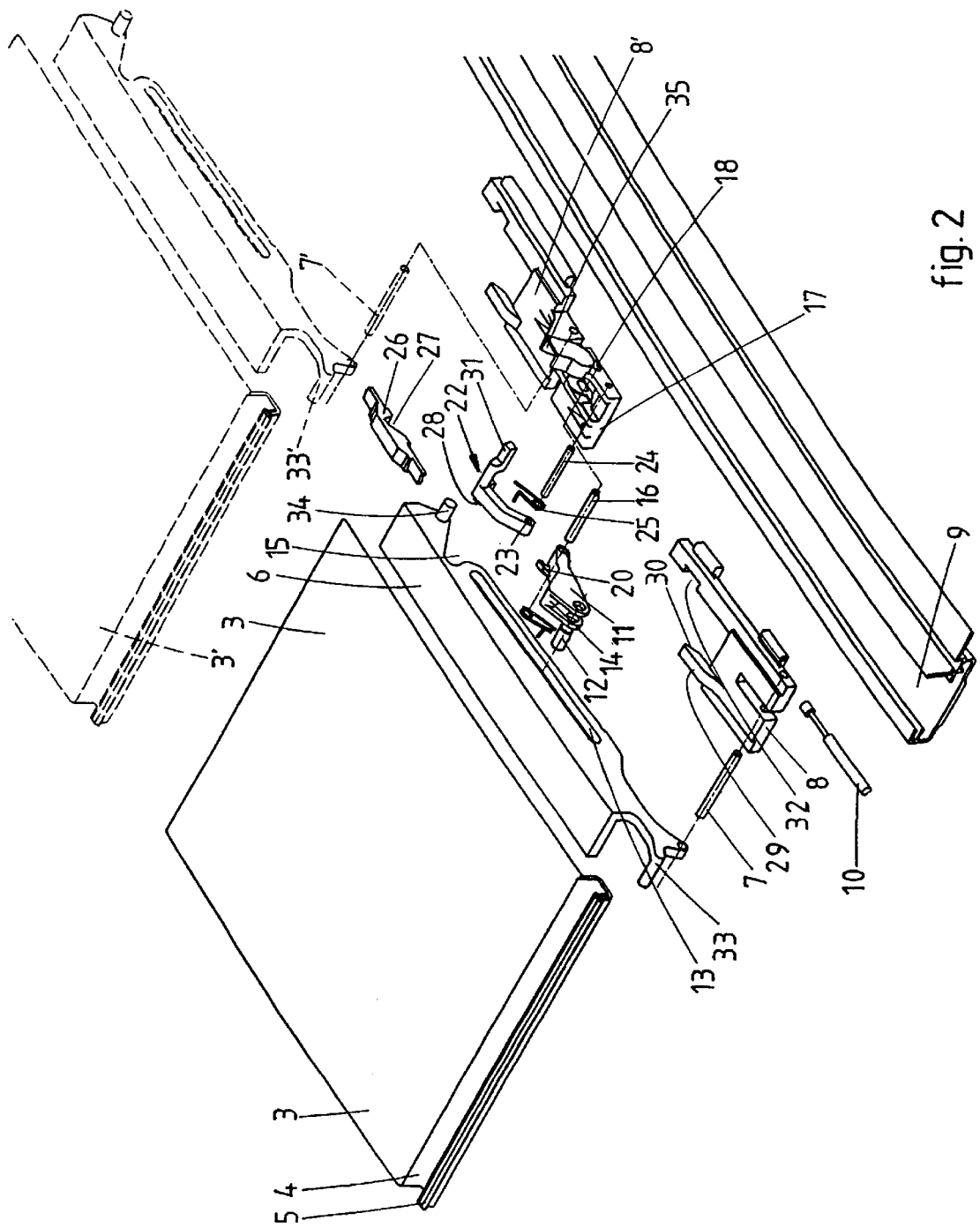
FIG. 2 is a larger-scale exploded view of a part of a louvre, showing the parts of the associated operating mechanism present on one side of said louvre.

In FIG. 2 one louvre 3 is illustrated in full lines, while the louvre 3' present behind said louvre 3 is illustrated in dashed lines. Each louvre 3 is supported by a supporting member 6, which consists of a specially formed angle piece, whose horizontal flange is mounted on the underside of louvre 3, and whose vertical flange comprises several parts of the mechanism.

Mounted on the front end of supporting member 6 is a transverse pivot pin 7 functioning as a hinge for louvre 3, which is positioned a small distance before the front edge of water channel 4 of louvre 3, at a lower level. The pivot pin 7 is accommodated in a driving slide 8, which can move to and fro in an associated stationary, longitudinal guide 9 extending along the side edge of roof opening 2. The driving slide 8 of front louvre 3 is connected to a pressure-rigid driving cable 10, which is engaged by a manual crank or an electric motor or the like so as to move the cable 10 for opening or closing the roof opening 2 by moving the front driving slide 8.

Each louvre 3 is supported at a point behind the front hinge of pivot pin 7 by a lifting lever 11, which is provided at its upper end with a guide pin 12. The pivot pin 7 is slidably accommodated in a guide slot 13, which is present in the vertical portion of supporting member 6 for louvre 3. The guide slot 13 extends far in a forward direction. Lifting lever 11 furthermore comprises a locking cam 14 near its upper end, which can engage in a locking cavity or recess 15 in supporting member 6, behind guide slot 13, among other things.

Lifting lever 11 is provided near its bottom end with a cross pin 16, about which lever 11 can pivot. The cross pin 16 is accommodated in a slide 17. To this end, the slide 17 has a short, horizontal slot 18, in which the cross pin 16 of lifting lever 11 can make a small horizontal movement, whose function will be explained in more detail below. A torsion spring 19 loads lifting lever 11 in an upward direction of pivoting. A curved guide rib 20 is provided concentrically around cross pin 16, which guide rib 20 is capable of cooperating with a guide cam 21 in the shape of a segment of a circle, which is present on slide 17. The guide cam 21 is formed concentrically with the rear wall of slot 18.

Slide 17, which supports the lifting mechanism of front louvre 3, therefore, is fixedly connected to the driving slide 8' of the next louvre 3' of the open roof construction, which is illustrated in dashed lines in the drawing. The driving slide 8' corresponds with driving slide 8 to a large extent, but it cannot be directly driven by driving cable 10, but by driving slide 8 via slide 17. A coupling device 22 is provided to that end, which on the one hand locks driving slide 8' and slide 17 with respect to longitudinal guide 9 in the closed position of louvre 3', and which on the other hand is capable of releasing said locking engagement with respect to longitudinal guide 9 and of effecting an engagement with driving slide 8.

Coupling device 22 comprises a coupling arm 23, which is pivotally mounted in slide 17 by means of a cross pin 24. A torsion spring 25 or the like loads pivoted coupling arm 23 in an upward direction, that is, in a direction in which it locks slide 17 and driving slide 8' with respect to longitudinal guide 9. A locking element 26 is to this end formed in longitudinal guide 9, which includes a cavity 27, into which a locking cam 28 formed on coupling arm 23 can slip under the influence of spring 25.

Coupling arm 23 can be controlled by means of the driving slide 8 positioned in the front thereof, on which an operating element 29 comprising a downwardly sloping rear control surface 30 is formed. The control surface 30 is capable of engaging the upper side of coupling arm 23, which is capable of pressing said coupling arm 23 downwards when driving slide 8 moves to the rear with respect to slide 17, causing it to pivot about cross pin 24. When coupling arm 23 is operated by driving slide 8, coupling arm 23 will pivot downwards and a coupling cam 31 formed thereon will come into engagement with a coupling recess 32 in a rearward extension of driving slide 8. The coupling cam 31 fits loosely in a coupling recess 32, seen in a longitudinal direction (parallel to guide 9), so as to be able to move driving slide 8 with respect to slide 17 for operating the coupling arm 23, while coupling cam 31 is already in engagement with coupling recess 32.

In the rearward positions of slide 17, the engagement between coupling cam 31 and coupling recess 32 is maintained as a result of the engagement between the upper side of coupling arm 23 with an upward flange of longitudinal guide 9. In order to be able to pass the cavities 27 of locking elements 26 positioned further to the rear as well, a locking pin 33 or the like is formed on the supporting member 6' of rearward louvre 3', which locking pin 33 is positioned above coupling arm 23 when louvre 3' is being pivoted, thus preventing coupling arm 23 from pivoting upwards, as will be explained in more detail below.

Another part of the operating mechanism for louvre 3 is made up of a locking pin 34, which is formed on supporting member 6 for louvre 3, and which, in the lowermost, closed position of louvre 3, can come into engagement with a locking slot 35 formed on slide 17, which is open at its upper side and which is curved in forward direction from the entry portion so as to be able to secure locking pin 34 against upward movement in the closed position of louvre 3.

Now the operation of the various mechanisms and devices will be explained with reference to various Figs., in which said mechanisms and devices are jointly or separately illustrated.

Figure 5:
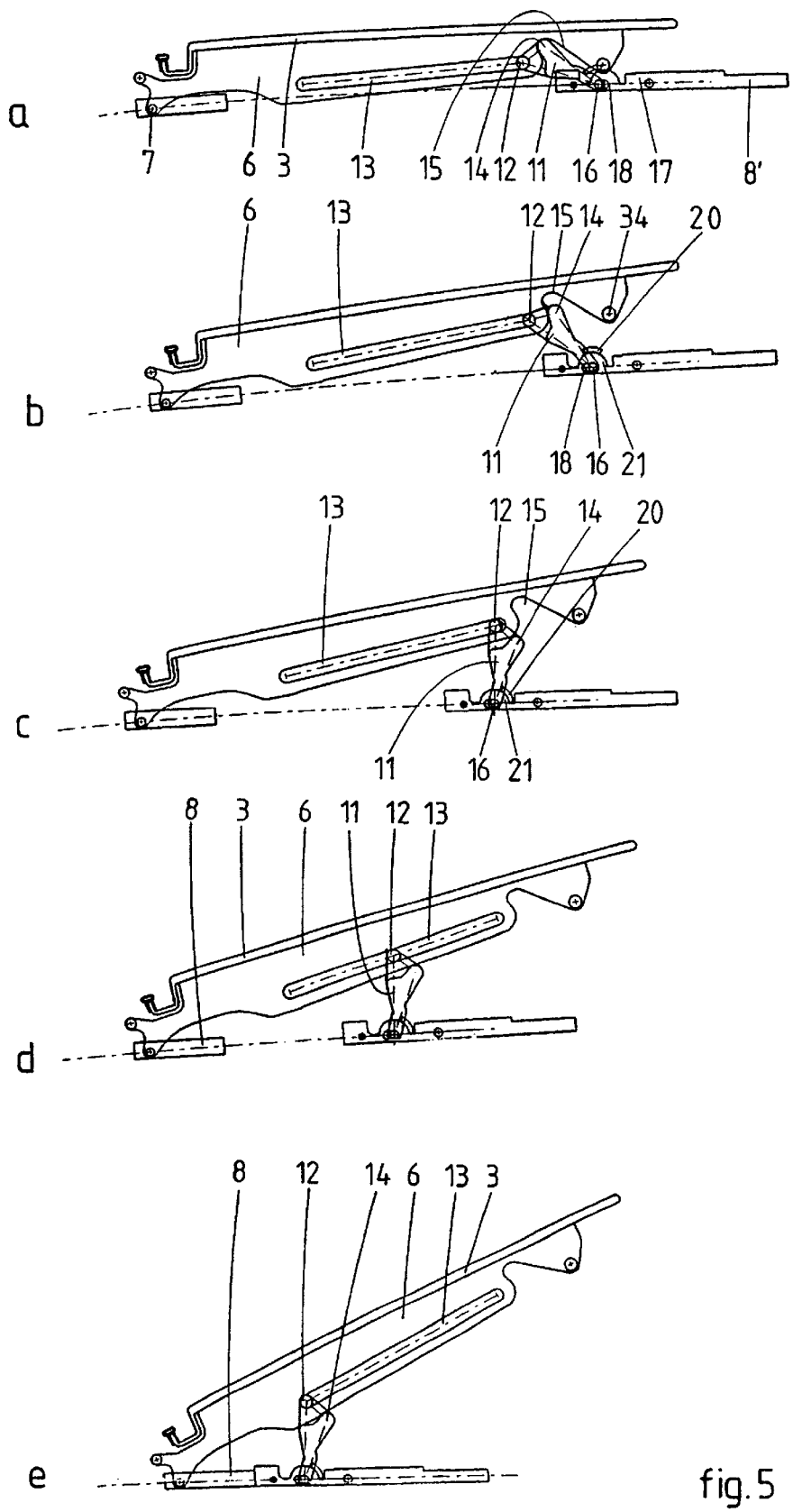
FIGS. 5a–e are side views of the lifting mechanism for a louvre in different positions thereof.

FIGS. 4a–4e and 5a–5e illustrate the operation of lifting lever 11 and the parts that cooperate therewith. FIGS. 4a and 5a show the louvre 3 in the lowermost, flat, closed position, and lifting lever 11 thereby occupies the extreme forwardly pivoted position, wherein locking cam 14 of lifting lever 11 is present in locking cavity 15 of the supporting member 6 of the louvre 3, and wherein guide pin 12 is positioned at the rear of guide slot 13. Cross pin 16 is present at the front of slot 18, while locking pin 34 of supporting member 6 is positioned at the bottom of locking slot 35. Movement of louvre 3 is not possible in this position. Only by moving louvre 3 rearwards by means of driving slide 8 will the lifting lever 11 be released, because cross pin 16 on the lower end of lifting lever 11 moves rearwards in slot 18 in slide 17, as a result of which also locking pin 34 is moved rearwards in locking slot 35, so that the locking pin 34 lands in the entry and exit portion of locking slot 35, which enables it to move upwards. Further rearward movement of driving slide 8 by means of driving cable 10 results in upward pivoting of lifting lever 11, whereby guide pin 12 of lifting lever 11 remains within guide slot 13 in its rearmost position as a result of the engagement of locking cam 14 of lifting lever 11 in locking cavity 15. At its upper end, lifting lever 11 pivots about stationary guide pin 12, therefore, as a result of which the rear edge of the louvre 3 is moved upwards, while front pivot pin 7 of driving slide 8 moves rearwards simultaneously therewith. This is illustrated in FIG. 5b. During said pivoting of lifting lever 11, guide rib 20 engages behind guide cam 21 on slide 17, as a result of which lower cross pin 16 is held in its rearmost position in slot 18.

In FIGS. 4b and 5c, driving slide 8 has been moved to the rear and lifting lever 11 has consequently been pivoted so far that locking cam 14 no longer prevents relative movement between guide pin 12 and guide slot 13, and that it no longer performs a locking function in locking cavity 15, but a supporting function for supporting member 6, while it also prevents lifting lever 11 from pivoting back with respect to louvre 3.

In FIG. 5d, further rearward movement of driving slide 8 has resulted in movement of guide pin 12 of lifting lever 11 in guide slot 13 of supporting member 6 of louvre 3. Since the position of lifting lever 11 remains approximately the same, but the distance between the point of engagement of lifting lever 11 and front pivot pin 7 of louvre 3 becomes smaller and smaller, further rearward movement of front pivot pin 7 of louvre 3 will also cause louvre 3 to pivot further about said pivot pin 7.

In FIGS. 4c and 5e, guide pin 12 has reached the front end of guide slot 13, and louvre 3 has reached its extreme pivoted position. Lifting lever 11 is now in engagement with the underside of supporting member 6 in two spaced-apart places, so that, in combination with the engagement of guide pin 12 and guide slot 13, a stable support of louvre 3 by lifting lever 11 is achieved. As a result of this, and as a result of the fact that the louvre 3 is relatively small, flapping movement of louvre 3 can be prevented, even at high vehicle speeds, in spite of the fact that the rear supporting point for louvre 3 is located only a small distance away from front pivot pin 7. This small distance makes it possible to nest louvres 3 close together, as a result of which a relatively large part of roof opening 2 can be cleared.

In the position shown in FIGS. 4c and 5e, and as will also be explained further on, the coupling device 22 has been operated so that slide 17 and driving slide 8' of the next louvre 3', seen in a rearward direction, are coupled together and uncoupled from stationary longitudinal guide 9, as a result of which further movement of driving slide 8 in the rearward direction will result in rearward movement of driving slide 8' of next louvre 3', causing it to make the same movement as first louvre 3.

In FIG. 4e, also the second louvre 3' has been moved to its extreme pivoted position, and a next louvre 3" can be moved in the same manner. If it is desired to open the open roof construction completely, the above operations will be continued until all louvres 3 are disposed close together in a sloping position near the rear edge of roof opening 2.

FIGS. 6a–f show the operation of coupling device 22, which ensures that louvres 3 are operated in the right order. The figs. show the two front louvres 3 in their entirety and the driving slide 8 of the third louvre.

FIG. 6a shows that each coupling arm 23 occupies the uppermost position, wherein locking cam 28 of coupling arm 23 is present in cavity 27 of locking element 26 (not shown). The torsion spring 25 (not shown) ensures that this position is maintained.

In FIG. 6b, front driving slide 8 is shown to have been moved so far rearwards that the control surface 30 of operating element 29 of driving slide 8 has come into contact with the upper surface of the coupling arm 23.

In FIG. 6c, operating element 29 has pressed the coupling arm 23 completely downwards, and coupling cam 31 of coupling arm 23 has moved into coupling recess 32 of driving slide 8, as a result of which driving slide 8 and slide 17 and next driving slide 8' form one unit, not taking into account the play of coupling cam 31 in coupling recess 32. When said unit moves rearwards, coupling arm 23 will be moved under a horizontal flange of longitudinal guide 9, thus keeping it in its lowermost coupling position, independently of the operating element 29 of driving slide 8.

In FIG. 6d, three louvres have meanwhile been coupled and been moved to the pivoted position. As is shown in FIG. 6d, coupling arms 23 are also kept in their lowermost position because the locking pin 33 present on the front end of louvre 3 has been moved above coupling arm 23 as a result of the pivoting of louvre 3, which position will be maintained until louvre 3 has been pivoted back again.

This additional locking of coupling arm 23 in its lowermost position is useful when moving the louvres 3 back in a forward direction to the closed position again, whereby control surface 30 of operating element 29 of driving slide 8 will in any case no longer exert pressure on top of coupling 23, even becoming detached therefrom, due to the fact that there is some play. During said return to the closed position, upward movement of coupling arm 23 is indeed stopped by the horizontal flange of longitudinal guide 9, but the coupling arm 23 of coupling devices 22 of front louvres 3 must pass the cavity 27 of locking elements 26 of louvres 3 disposed further to the rear, and they must not be pressed into the wrong cavity by torsion spring 25 upon passing. Because the additional locking of the coupling arm 23 is related to the pivoted position of louvre 3, the locking cam 28 of each coupling arm 23 cannot move into cavity 27 of the associated locking element 26 before the locking engagement of coupling arm 23 has been released as a result of the louvre 3 pivoting back, and consequently a locking engagement with respect to longitudinal guide 9 can only be effected in the closed position of each panel 3, in which it is not pivoted. In this manner, it is arranged that each locking cam 28 can only engage in the cavity 27 of the associated locking element 26, therefore. Consequently, FIG. 6 shows that the coupling arm 23 of the third louvre can move upwards into cavity 27 (not shown) with its locking cam 28 because locking pin 3" has released locking arm 23.

From the foregoing it will be apparent that the invention provides an open roof construction and a method for opening and closing same which is suitable for a large roof opening, whereby said roof opening can be cleared to a large degree without endangering the stability of the closing elements.

Of course several variations of the illustrated embodiment are possible. Thus, it would also be possible to open the open roof construction from the rear to the front, whereby the rearmost louvre will be the first to start pivoting, albeit in a rearwardly sloping position again.

What is claimed is:

1. A method for opening and closing an open roof construction of a vehicle having a roof opening in its fixed roof, which comprises at least three movably supported louvres for selectively closing or at least partially opening said roof opening, wherein said louvres are moved between their closed position, in which they abut against each other to close the roof opening, and in an open position, in which they are positioned close together, one behind the other, in an obliquely upwardly pivoted position, wherein in order to open the roof from the front side, the louvre present at the opening side pivots upwards and slides to the open position first, after which the adjacent louvres are successively opened by being operated by the preceding louvre.

2. The method according to claim 1, wherein each louvre is operated to pivot upwardly and slide simultaneously until it is locked with respect to the next louvre.

3. The method according to claim 2, wherein each louvre is pivoted first by rotation of a lifting lever and then further as a result of a movement of the louvre in the opening direction relative to the lifting lever.

4. An open roof construction for a vehicle having a roof opening in its fixed roof, which comprises at least three louvres, each louvre including a support slidable on at least one longitudinal guide extending along the roof opening, the louvres selectively closing or at least partially opening said roof opening, wherein said louvres abut in the closed position to close the roof opening, and wherein they are disposed close together, one behind the other, in an obliquely upwardly pivoted position, in their open position, and which furthermore comprises a coupling engaging each support, wherein the coupling of each support engages the longitudinal guide, in such a manner that in order to open the roof opening from a front side, the louvre present at the opening side, pivots upwardly and slides to the open position first, after which the adjacent louvres successively start to move along when the corresponding coupling is operated by the preceding louvre.

5. The open roof construction according to claim 4, wherein said coupling comprises a movable element, which can move between a locked position, in which it is in engagement with said longitudinal guide, and a coupled position, in which it is in engagement with a support of an adjacent louvre.

6. The open roof construction according to claim 4, wherein each louvre is provided with an associated pivoting device, which is supported on a slide, which also supports a pivot of an adjacent louvre.

7. The open roof construction according to claim 6, wherein each coupling is disposed on the slide, wherein said coupling can be operated by an operating element on a preceding slide.

8. The open roof construction according to claim 5, wherein each movable element of the coupling is held in its coupled position by said longitudinal guide.

9. The open roof construction according to claim 4, wherein each louvre is provided with a recessed water channel in its transversely extending edge near a pivoting point of the louvre, wherein the free edge of said water channel engages under the adjacent louvre with the interposition of a seal.

10. The open roof construction according to claim 4, wherein each louvre comprises a lifting element, which movably engages the louvre and which moves in a direction of the pivoting point of the louvre during the opening movement of said louvre.

11. The open roof construction according to claim 5, wherein each movable element of the coupling is held in the pivoted position of the next louvre by a locking element, which has been moved to the locked position by the pivoting of the associated louvre.

* * * * *